United States Patent
Hanson et al.

(10) Patent No.: US 10,431,929 B2
(45) Date of Patent: *Oct. 1, 2019

(54) BUFFERING APPARATUS FOR MESSENGERED CABLES

(71) Applicant: PPC Broadband, Inc., East Syracuse, NY (US)

(72) Inventors: Brian K. Hanson, Cicero, NY (US); Noah P. Montena, Syracuse, NY (US)

(73) Assignee: PPC BROADBAND, INC., East Syracuse, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/269,963

(22) Filed: Sep. 19, 2016

(65) Prior Publication Data
US 2017/0085025 A1  Mar. 23, 2017

Related U.S. Application Data

(63) Continuation of application No. 14/860,635, filed on Sep. 21, 2015, now Pat. No. 9,450,333.

(Continued)

(51) Int. Cl.
| | |
|---|---|
| *H01R 13/62* | (2006.01) |
| *H01R 13/635* | (2006.01) |
| *H01R 13/58* | (2006.01) |
| *H01R 9/05* | (2006.01) |
| *H01R 24/40* | (2011.01) |
| *H02G 7/04* | (2006.01) |
| *H02G 7/18* | (2006.01) |
| *H01R 107/00* | (2006.01) |
| *H01R 13/639* | (2006.01) |
| *H01R 101/00* | (2006.01) |

(52) U.S. Cl.
CPC ........ *H01R 13/635* (2013.01); *H01R 9/0503* (2013.01); *H01R 13/5804* (2013.01); *H01R 24/40* (2013.01); *H02G 7/04* (2013.01); *H02G 7/18* (2013.01); *H01R 13/6392* (2013.01); *H01R 2101/00* (2013.01); *H01R 2107/00* (2013.01)

(58) Field of Classification Search
CPC .............................. H01R 17/12; H01R 13/639
USPC .......................... 439/578, 582, 585, 369, 352
See application file for complete search history.

(56) References Cited

U.S. PATENT DOCUMENTS

| | | |
|---|---|---|
| 5,620,340 A | 4/1997 | Andrews |
| 5,664,968 A | 9/1997 | Mickievicz |

(Continued)

*Primary Examiner* — Phuong Chi T Nguyen
(74) *Attorney, Agent, or Firm* — Oliff PLC

(57) ABSTRACT

A tensile-force buffering apparatus interposes a physical structure and a drop clamp having a messenger of an input drop cable secured thereto. The tensile-force buffering apparatus includes an outer housing defining an elongate inner cavity and a retainer, and a spring-strut assembly. The spring-strut assembly includes a central shaft, a retention member at a first end of the central shaft, and a coil spring disposed about the central shaft. The spring-strut assembly is received in the cavity of the outer housing, and the retention member is held by the retainer while a load compressing the coil spring is less than a predetermined threshold load. The retention member is released from the outer housing when the load compressing the coil spring reaches the predetermined threshold load, thereby effecting separation of the spring-strut assembly from the outer housing.

14 Claims, 7 Drawing Sheets

Related U.S. Application Data

(60) Provisional application No. 62/052,512, filed on Sep. 19, 2014, provisional application No. 62/052,516, filed on Sep. 19, 2014.

(56) References Cited

U.S. PATENT DOCUMENTS

| | | |
|---|---|---|
| 6,116,926 A | 9/2000 | Ortega et al. |
| 6,184,460 B1 | 2/2001 | Bertoncini |
| 6,220,896 B1 | 4/2001 | Bertoncini et al. |
| 7,381,092 B2 | 6/2008 | Nakada |
| 7,669,633 B2 * | 3/2010 | Berger .................. E06B 9/264 160/107 |
| 9,450,333 B2 * | 9/2016 | Hanson .............. H01R 13/5804 |

* cited by examiner

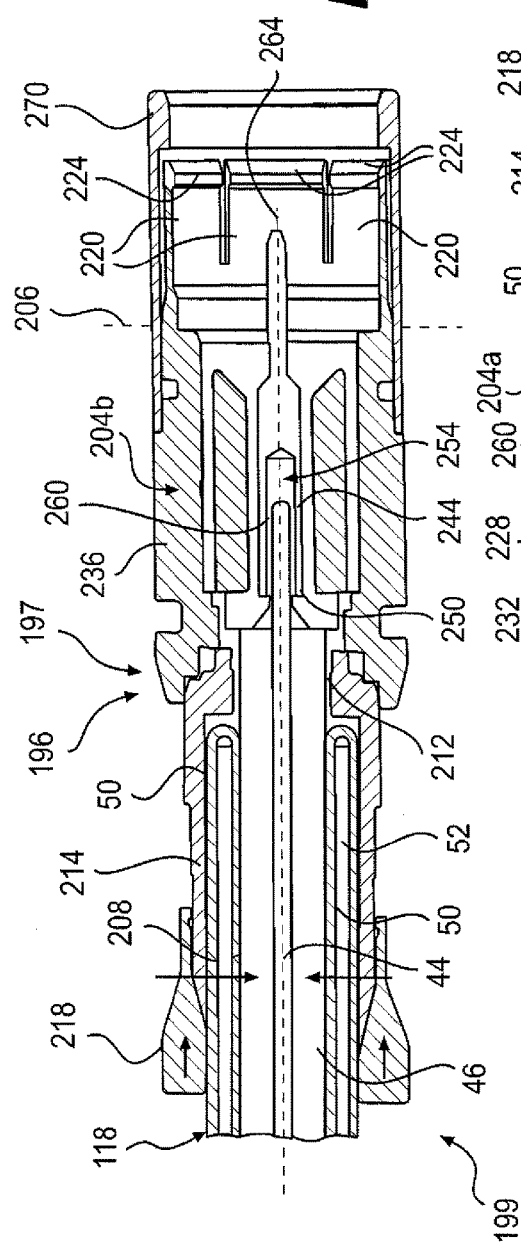

BUFFERING APPARATUS FOR MESSENGERED CABLES

CROSS-REFERENCE TO RELATED APPLICATIONS

This application is a continuation of U.S. application Ser. No. 14/860,635, filed on Sep. 21, 2015, pending, which is a non-provisional application that claims the benefits of priority of U.S. Provisional Application No. 62/052,512, filed on Sep. 19, 2014, and U.S. Provisional Application No. 62/052,516, filed on Sep. 19, 2014, the disclosures of which are incorporated herein by reference in their entirety.

In addition, the entire contents of the following applications are hereby incorporated into this application by reference: (a) U.S. patent application Ser. No. 14/725,146, filed on May 29, 2015; (b) U.S. patent application Ser. No. 14/725,548, filed on May 29, 2015, and (c) U.S. patent application Ser. No. 14/860,627, filed on Sep. 21, 2015.

BACKGROUND

Coaxial cable is known to be routed above and below ground between utility poles and a mounting structure of a subscriber's home/office environment. When located above ground, the aerial cable extends between a support at each end and includes an anchor wire or "messenger" molded, or otherwise formed in combination with an outer sleeve of the aerial cable. As such, the messenger extends along the exterior of the aerial cable and is tied to support structures, e.g., an anchor" having a P-shape, at each end of the cable.

If the aerial cable is struck by a tree or limb, the resulting tensile loads transmitted into the anchoring hardware can result in damage to the: support structure, anchor, tie-off brackets, messenger wire, or the cable itself. Additionally, tree branches may lean upon the aerial cable, effecting a steady, continuous, tensile load which can produce significant cable line damage. In either case, damage to the cable and/or to the anchoring hardware, often results in loss of service, requiring time to schedule, investigate and perform the requisite repairs. If essential services are provided over the cable, such as phone or Internet service, a loss of service of more than a few hours may be entirely unacceptable.

The inclusion of anchoring apparatuses which flex to absorb excess tension in the cable are available and can eliminate damage in many circumstances. However, more recently, major storms are resulting in longer periods of signal and power outages. Such signal/power outages can become life-threatening should a customer require connection to ambulatory/emergency/911 services.

Therefore, there is a need to overcome, or otherwise lessen the effects of, the disadvantages and shortcomings described above.

SUMMARY

In accordance with various aspects of the disclosure, a tensile-force buffering apparatus interposes a physical structure and a drop clamp having a messenger of an input drop cable secured thereto. The tensile-force buffering apparatus includes an outer housing defining an elongate inner cavity and a retainer, and a spring-strut assembly. The spring-strut assembly includes a central shaft, a retention member at a first end of the central shaft, and a coil spring disposed about the central shaft. The spring-strut assembly is received in the cavity of the outer housing, and the retention member is held by the retainer while a load compressing the coil spring is less than a predetermined threshold load. The retention member is released from the outer housing when the load compressing the coil spring reaches the predetermined threshold load, thereby effecting separation of the spring-strut assembly from the outer housing.

According to various aspects of the disclosure, a tensile-force buffering apparatus interposes a physical structure and a drop clamp having a messenger of an input drop cable secured thereto. The tensile-force buffering apparatus includes an outer housing including a first shell and a second shell cooperating to define an elongate inner cavity in the housing, a spring-strut assembly, and a strap wrapped around the first shell and the second shell to hold the first shell and the second shell together. Each of the first shell and the second shell define a retainer. The spring-strut assembly includes a central shaft, a retention member at a first end of the central shaft, a coil spring disposed about the central shaft, and a fastener configured to engage an end of the central shaft to transfer tensile loads from the central shaft into the coil spring and the retention member. The spring-strut assembly is received in the cavity of the outer housing and the retention member is held by the retainer while a load compressing the coil spring is less than a predetermined threshold load. The retention member is released from the outer housing when the load compressing the coil spring reaches the predetermined threshold load, thereby effecting separation of the spring-strut assembly from the outer housing.

In some aspects of the disclosure, a tensile-force buffering apparatus having a first end and a second end interposes a first connector at the first end configured to be coupled to a physical structure and a second connector at the second end configured to be coupled with a drop clamp having a messenger of an input drop cable secured thereto. The tensile-force buffering apparatus includes an outer housing including a first shell and a second shell cooperating to define an elongate inner cavity in the housing. Each of the first shell and the second shell define a retainer. The tensile-force buffering apparatus includes a spring-strut assembly including a central shaft, a retention member at a first end of the central shaft, and a coil spring disposed about the central shaft between a first washer and a second washer. The first washer is disposed at the first end of the central shaft between the coil spring and the retention member, and the second washer is disposed at a second end of the central shaft. A fastener is configured to engage the second end of the central shaft to transfer tensile loads from the central shaft into the coil spring and the retention member, and a strap is wrapped around the first shell and the second shell to hold the first shell and the second shell together. The spring-strut assembly is received in the cavity of the outer housing and the retention member is held by the retainer while a load compressing the coil spring is less than a predetermined threshold load. The retention member is released from the outer housing when the load compressing the coil spring reaches the predetermined threshold load, thereby effecting separation of the spring-strut assembly from the outer housing.

BRIEF DESCRIPTION OF THE DRAWINGS

Features and advantages of the present disclosure are described in, and will be apparent from, the following Brief Description of the Drawings and Detailed Description.

FIG. 5 is an enlarged view of a first half of the exemplary breakaway connector of FIG. 4.

FIG. 6 is an enlarged view of a second half of the exemplary breakaway connector of FIG. 4.

DETAILED DESCRIPTION

According to embodiments of the disclosure, a tensile shock absorber or tensile force buffering apparatus is disclosed which interposes existing aerial cable attachment hardware. Tension loads applied to the aerial cable flow through a buffering spring-strut assembly which releases upon receipt of a threshold tensile load. High or sudden forces result in extension over a manageable distance, producing work (such as by compression of a spring), and dissipating impulse energy over a longer time interval to reduce the overall impact. This may be achieved by one of a variety of ways. One of the solutions is a single event, while another is reusable. Yet another option relates to the use of integral versus separate absorber components. These will be discussed in greater detail in the subsequent paragraphs.

An example of a reusable, multi-event, non-integral device includes an extension spring interposing an attachment hook (on the side of a house) and a messenger tie-off bracket. Ordinarily, the messenger tie-off bracket is connected directly to the hook, but in this instance, a spring extends when large loads are placed on the cable, and returns when loads subside.

An example of a non-reusable, integral device includes a tie-off bracket configured such that loads greater than a threshold value cause a portion of the bracket to extend and permanently yield, but remaining connected to maintain service. Thereafter, the cable may be replaced to restore the cable to its original span height. Yet another, integral, non-reusable solution involves the placement of elements with highly specific sheer, or tensile failure modes, in series with a sturdier bracket or hook components. Such excess load causes the bracket or hook to sever at a threshold load level above the ordinary weight or wind-induced sway loads, but below that which damages the cable or siding. When a breakaway anchor is used, a releasable splice connection or junction is placed in-line with the coaxial cable so that it might disconnect from the home without damage.

Yet another option is a combination of a spring-based absorber, tuned to diffuse moderate loads, and a sheer-based breakaway limiter tuned to bypass more extreme loads. This final option provides the ultimate protection against unnecessary loss of service, while safeguarding the line and the home from destructive damage.

Figure 1:
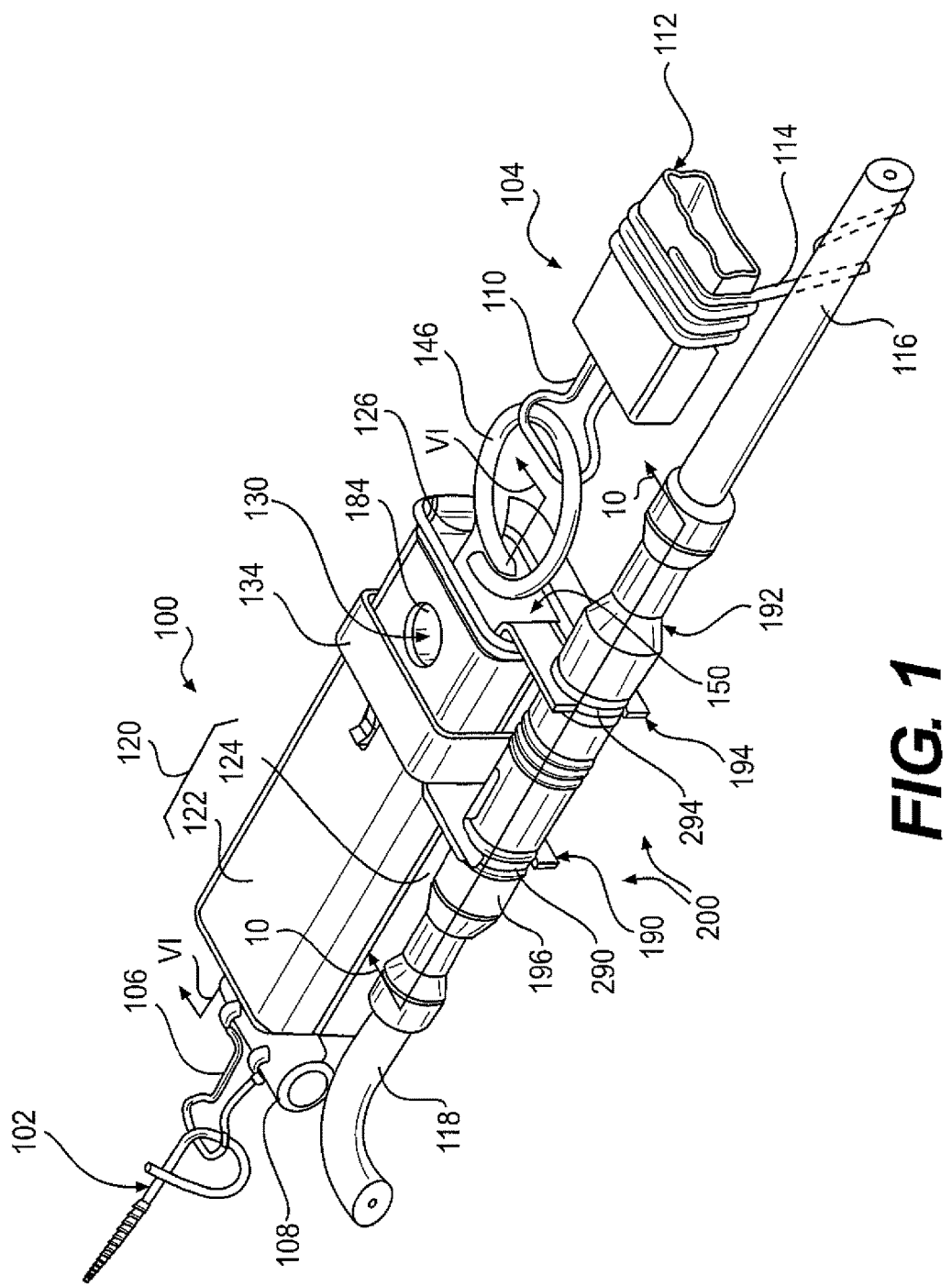
FIG. 1 is a perspective view of the exemplary breakaway connector of FIG. 1 in combination with an exemplary buffering apparatus according to various aspects of the disclosure.
Figure 2:
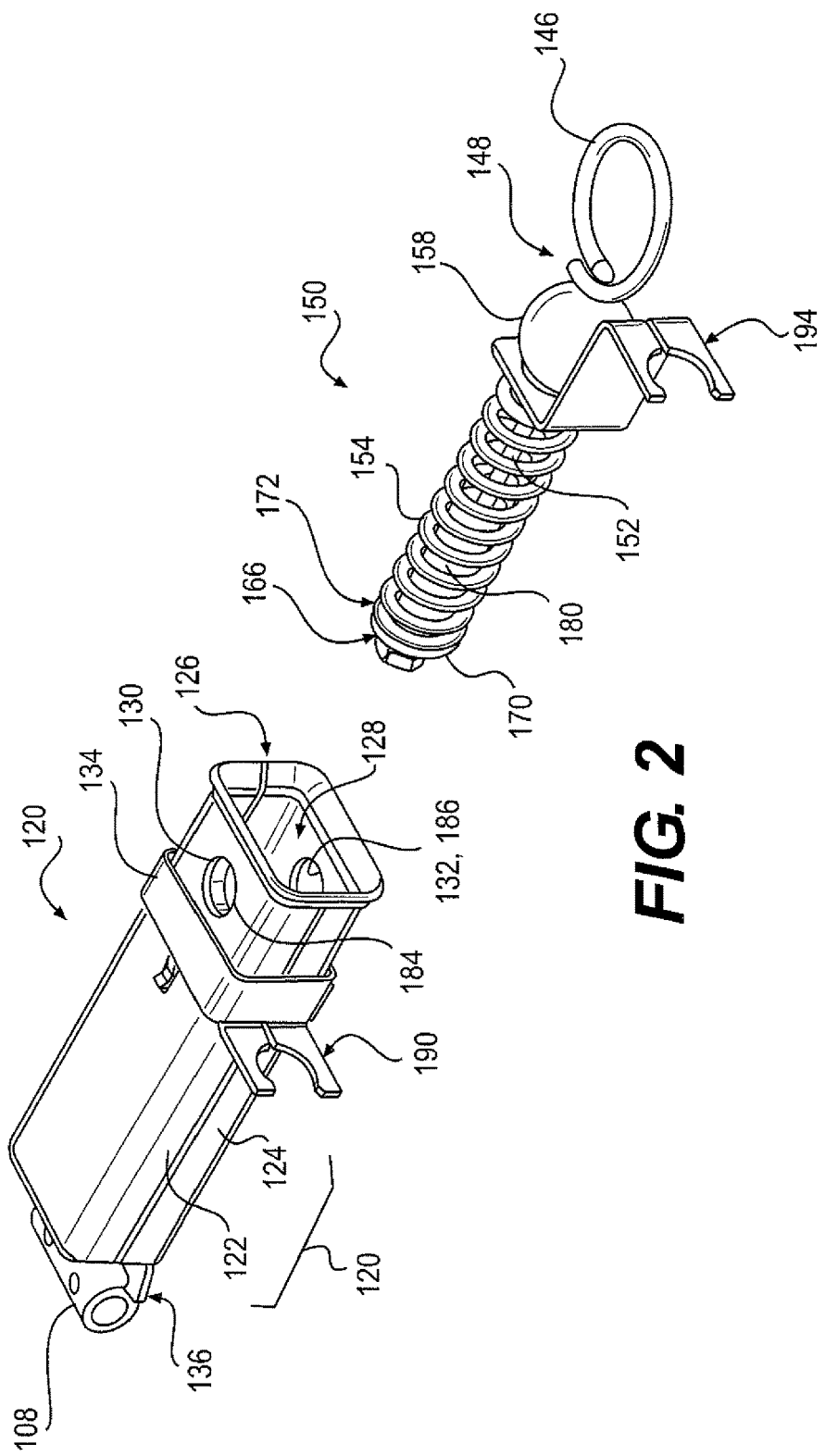
FIG. 2 is an exploded, perspective view of the exemplary buffering apparatus of FIG. 1.
Figure 3:
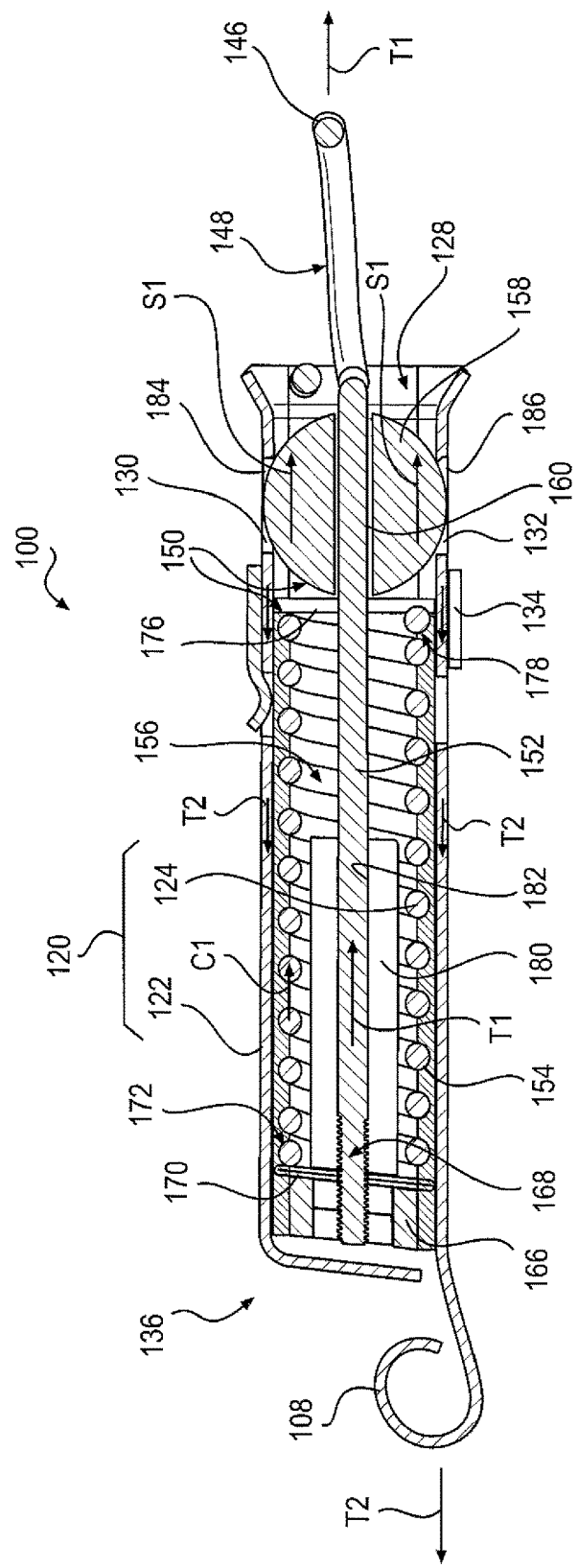
FIG. 3 is a cross-sectional view of the exemplary buffering apparatus taken substantially along line III-III of FIG. 1.

As shown in FIGS. 1-3, a tensile force buffering apparatus 100 is disclosed in combination with a breakaway connecter 200, such as that described in commonly-owned, co-pending U.S. Pat. No. 14/860,627, entitled "Breakaway Connector for Drop/Aerial/Messengered Coaxial Cables," filed concurrently herewith and incorporated herein in its entirety.

Referring to FIG. 2, the tensile-force buffering apparatus 100 includes an outer housing 120 and a spring strut assembly 150. According to various embodiments, the outer housing 120 may be configured as a clam-shell outer housing having a first shell 122 and a second shell 124, which are split along a bifurcating plane 126. The first and second shells 122, 124 define an elongate inner cavity 128 for receiving the spring-strut assembly 150. At least one of the first and second shells 122, 124 defines a retainer 130, 132 for engaging and retaining the spring-strut assembly 150, i.e., when the shells 122, 124 are disposed over and capture the spring-strut assembly 150 within the inner cavity 128 of the housing 120. The first and second shells 122, 124 are held together by at least one outer strap 134 which wraps around the outer periphery of each of the shells 122, 124. When a single strap 134 is used at one end of the housing 120, the first and second shells 122, 124 may be held together at the other end 136 by a hook arrangement (not shown) wherein one of the shells 122, 124 hooks into the other of the shells 122, 124 to define a clam-shell hinge, as would be understood by persons of ordinary skill in the art.

The end 136 of the outer housing 120 may include a structure for coupling the end 136 of the buffering apparatus 100 to a physical structure, such as a building, via a wire end fitting 106 and the P-shaped anchor 102. In some aspects, one of the first and second shells 122, 124 may include rolled end 108 for receiving the wire end fitting 106, which in turn is connected with the P-shaped anchor 102.

As best illustrated in FIG. 3, the spring-strut assembly 150 includes a central shaft 152 integrated with an eyelet 146 at a first end 148 of the shaft 152 and a coil spring 154 having a void 156 configured to receive the central shaft 152. The spring-strut assembly 150 further includes a retention member 158 having an aperture 160 for receiving the shaft 154 and being disposed between the eyelet 148 and the coil spring 154. According to some embodiments, the retention member 158 may be configured as a ball or sphere 158. However, it should be appreciated that the retention member 158 can have other configurations capable of coupling with the at least one retainer 130, 132. Similarly, the at least one retainer 130, 132 does not have to be configured as a hole, but instead can be a curved surface, a notch, a ridge, or any mechanical structure that can operate to retain the retention member 158, and thus the spring-strut assembly, in the cavity 128 of the outer housing 120.

The spring-strut assembly 150 also includes a fastener 166 configured to engage a second end 168 of the shaft 152 to transfer tensile loads from the shaft 152 into the coil spring 154 and the retention member 158. In the described embodiment, a first washer 170 is disposed between and abuts the fastener 166 and a first end 172 of the coil spring 154. A second washer 176 is disposed between and abuts a second end 178 of the coil spring 154 and the retention member 158. Finally, a cylinder 180 defines a central bore 182 for receiving the shaft 152 and is disposed within the void 156 to guide the coil spring 154 and prevent out-of-plane buckling thereof.

Returning to FIG. 1, the first and second shells 122, 124 of the housing 120 define a first U-shaped clip or flange 190 configured to receive the second connector portion 196 of the break-away connector 200. For example, the flange 190 may be configured to engage an annular groove 290 of the second connector portion 196. A second U-shaped clip or flange 194 is disposed around the shaft 152 of the spring-strut assembly 150, i.e., between the coil spring 154 and the retention member 158, and is configured to receive the first connector portion 192 of the break-away connector 200. For example, the flange 194 may be configured to engage an annular groove 294 of the first connector portion 192. Functionally, the first and second clips 190, 194 split the connector 200 apart when the spring-strut assembly 150 separates from the clam shell housing 120. That is, the first and second clips 190, 194 cooperate with the annular grooves 290, 294 to ensure that the connector 200 separates along with the buffering apparatus 100.

Referring again to FIG. 1, the tensile-force buffering apparatus 100 interposes a P-shaped anchor 102 at one end and a drop clamp 104 at the other end. The drop clamp 104 includes a wire end fitting 110 which connects to a body 112 of the drop clamp 104. A messenger 114 of an input drop cable 116 wraps around and is secured to the body 110 of the drop clamp 104. The messenger 114 is wrapped around the aerial cable 116, i.e., disposed in combination with a fiber-reinforced jacket (not shown), and functions to transfer the tensile loads of the aerial cable 116 into the buffering apparatus 100. The P-shaped anchor 102 may comprise a threaded anchor configured to be screwed into wood siding or sheathing of a residence or other building structure (not shown). The P-Shaped 102 anchor connects to the wire end fitting 106, while the wire end fitting 110 of the drop clamp 104 loops around the eyelet 146 of the spring strut assembly 150 of the buffering apparatus 100. When a high strength, fiber-reinforced aerial cable is employed, the tensile loads of the cable may be transferred by a transition device such as that disclosed in commonly-owned, co-pending, U.S. application Ser. No. 14/725,146.

In operation, and referring to FIGS. 2 and 3, the spring-strut assembly 150 is disposed within the cavity 128 of the outer housing 120 and is captured between the shells 122, 124 such that a portion of retention member 158 engages the edges 184, 186 of each of the retainers 130, 132. Tensile loads T1 applied to the eyelet 146 are: (i) transferred to the shaft 152 and reacted as a compression load C1 in the coil spring 154, (ii) transferred as a shear load S1 across the retention member 158, and (iii) transferred to the messenger cable 102 as a tensile load T2 in the outer housing 120. When the loads compressing the coil spring 154 reach a threshold value, the outer housing 120 releases the retention member 158, thereby effecting separation of the spring-strut assembly 150 from the outer housing 120.

The loads releasing the spring-strut assembly 150 may be altered by varying the pre-compression of the coil spring 154. That is, the magnitude of the tensile load which releases the spring-strut assembly 150 can be increased or decreased by changing the force or load required to pull the retention member 158 from the retainers 130, 132. The magnitude of the threshold value may be varied by turning the eyelet 146, to turn the shaft 152 and thread the fastener 166. By threading the fastener 166, the coil spring 154 is compressed via the washer 170. In addition to the pre-load on the coil spring 152, the force or load required to release the spring-strut assembly 150 from the outer housing 120, may also be a function of the location of the strap 134, and, more particularly, a function of the distance between the end 136 of the housing, for example, the hinged end, and the strap 134. As the distance decreases, the mechanical advantage available to release the retention ball 158 increases. Hence, as the strap 134 is moved closer to the hinge, a lower force is required to release the retention member 158.

When the load is sufficiently high to separate the spring-strut assembly 150 from the outer housing 200, the first and second clips 190, 194 move with the respective structure. That is, the first clip 190 defined by the flange projecting from the first and second clam shells 122, 124 and the second clip 194 defined by the flange projecting from the spring-strut assembly, move apart from one another. Separation of the first and second clips 190, 194 effects the release/separation of the breakaway connector 200.

Thus, the tensile-force buffering apparatus 100 can be adjusted to allow some predetermined amount of force to be absorbed by the apparatus 100 before the outer housing 120 releases the retention member 158, thereby effecting separation of the spring-strut assembly 150 from the outer housing 120. For example, the tensile-force buffering apparatus 100 can be adjusted to accommodate coaxial cable or fiber optic cable. Because coaxial cable breaks at a lower force than fiber optic cable, for example, 150 lbs. force vs. 200 lbs. force, the apparatus can be configured such that the outer housing 120 releases the retention member 158 before experiencing 150 lbs. force in the case of a coaxial cable, but releases the retention member 158 at a greater force, but less than 200 lbs. force in the case of a fiber optic cable.

Figure 4:
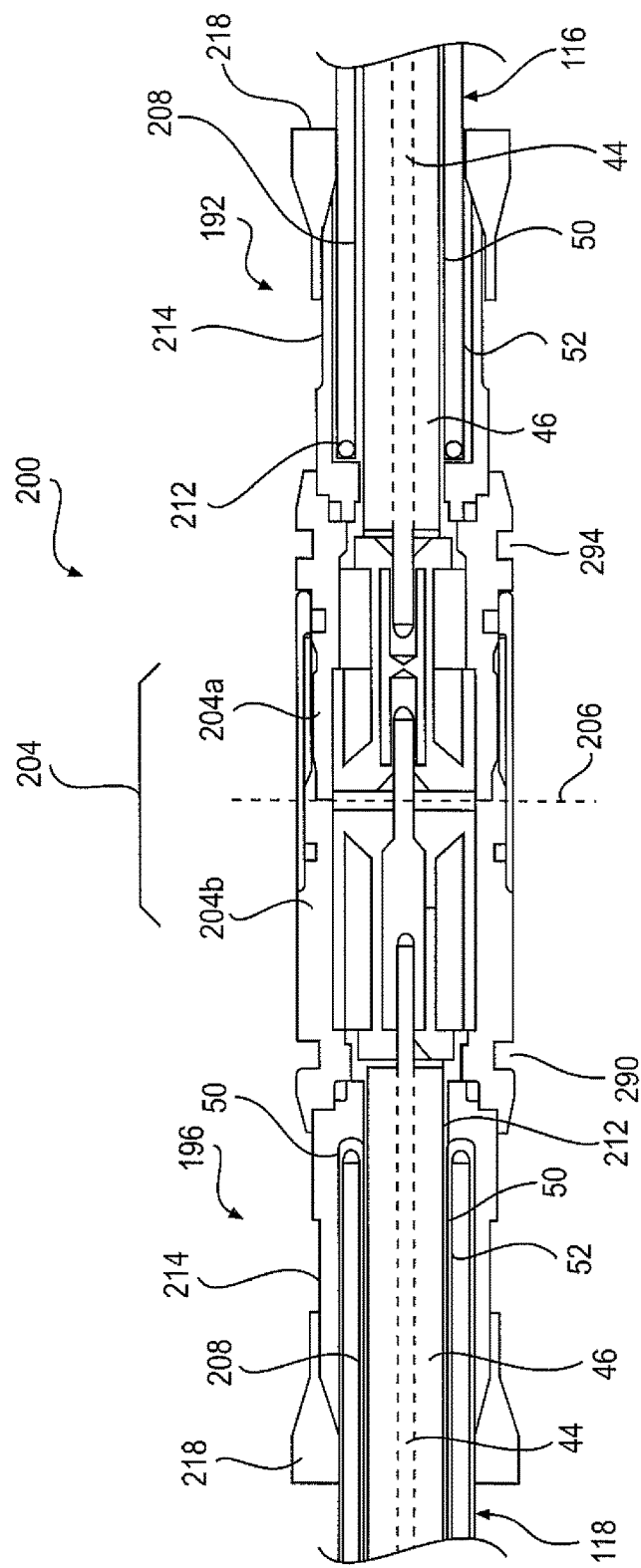
FIG. 4 is a cross-sectional view of an exemplary breakaway connector according to various aspects of the disclosure.
Figure 8:
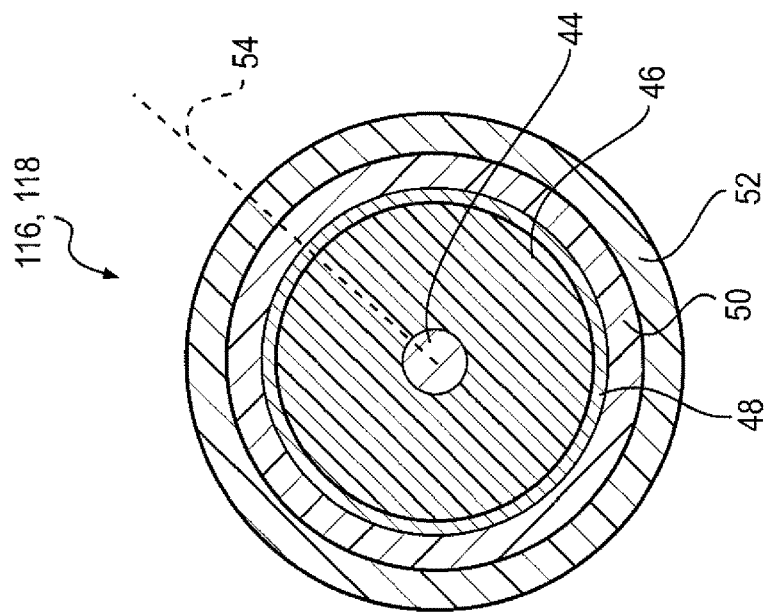
FIG. 8 is a cross-sectional view of the cable of FIG. 7, taken substantially along line VIII-VIII.

In FIG. 4, a breakaway connector 200 comprises a first connector portion 192, a second connector portion 196, and an adaptor 204. The adaptor 204 is separable along a mid-plane 206 to define a first adaptor portion 204a and a second adaptor portion 204b. The first adaptor portion 204a has a first end 205a coupled to a proximal end 193 of the first connector portion 192, and the second adaptor portion 204b has a first end 205b coupled to a proximal end 197 of the second connector portion 196.

The first connector portion 192 has a distal end 195 configured to receive a first drop cable 116, for example, an input drop cable, and the second connector portion 196 has a distal end 199 configured to receive a second drop cable 118, for example, an output drop cable. It should be appreciated that in some embodiments the first drop cable 116 may be an output drop cable, and the second drop cable 118 may be the input drop cable. The first and second adaptor portions 204a, 204b are configured to couple the first and second connector portions 192, 196 together.

The first and second connector portions 192, 196 each include an outer body 214 and a conductive tubular post 212 disposed at least partially within the outer body 214. The conductive posts 212 each include a barbed end 208 at the distal end 195, 199 of the respective connector portion 192, 196. Tapered end fasteners 218 are disposed at the distal ends 195, 199 of the connector portions 192, 196.

The first and second drop cables 116, 118 are prepared in a manner described in more detail below with reference to FIGS. 7-11. That is, an outer jacket 52 and an inner dielectric core 46 of the cables 116, 118 are stepped/spliced to expose an outer braided conductor 50 and an inner aluminum conductor 44. The outer braided conductor 50 is folded back over the outer jacket 52 to facilitate the insertion of the barbed end 208 of the conductive tubular post 212. More specifically, the folded end portion of the braided conductor 50 is inserted between the tubular post 212 and the outer body 214 such that the tapered end fastener 218 may be displaced axially, toward the mid-plane 206 of the adaptor 204. Axial displacement of the tapered end fastener 218 toward the mid-plane compresses the outer body 214 in a radially inward direction toward the barbed end 208 of the conductive tubular post 212. Compression of the outer body 214 causes the barbed end 208 to engage the braided outer conductor 50 and the outer jacket 52 such that the respective drop cable 116, 118 is axially retained relative to the outer body 214 of the connector 200.

As shown in FIG. 5, the second adaptor portion 204b includes a conductive outer body 236b having a plurality of resilient fingers 220. Each of the resilient fingers 220 includes an arcuate lip retainer 224 that extends radially inward from the respective finger 220 and then extends radially outward. The first adaptor portion 204a includes a conductive outer body 236a having a ring-shaped groove 228 formed about/in its periphery. The ring-shaped groove 228 includes a circumferential retention lip 232 and is configured to receive the arcuate lip retainer 224 of each resilient finger 220. The arcuate lip retainers 224 of the resilient fingers 220 engage the ring-shaped groove 228 to couple the first and second adaptor portions 204a, 204b, which are held together as the arcuate lip retainers 224 engage the circumferential retention lip 232. While in the described embodiment, the fingers 220 are integrally formed as a single piece with the conductive body 236b of the second adaptor portion 204b, the resilient fingers 220 may be a separate component which may be fastened, retained, or otherwise secured to the conductive body 236b.

The breakaway connector 200 maintains grounding and shielding conductivity through the conductive outer bodies 236a, 236b of the first and second adaptor portions 204a, 204b. More specifically, the outer braided conductor 50 of the drop cables 116, 118 electrically connects to the conductive tubular posts 212 which, in turn, are electrically connected to the conductive outer body 236a, 236b of each of the first and second adaptor portions 204a, 204b.

The adaptor 204 also includes a bi-directional inner conductor engager 240 (FIG. 6) at the geometric center of the first adaptor portion 204a and a unidirectional inner conductor engager 244 (FIG. 5) at the geometric center of the second adaptor portion 204b. The bi-directional engager 240 allows for the inner conductors 44 of the drop cables 116, 118 to be in opposed relation, i.e., the protruding inner conductor pin 260 of one drop cable 116 (after a splicing operation) faces the protruding inner conductor pin 260 of the other drop cable 118. The protruding inner conductor pins 260 may originate from prepared ends of each of the drop cables 116, 118. The unidirectional pin engager 244, which is integrated with the second adaptor portion 204b, includes a protruding inner conductor pin 264. Each of the bi-directional or unidirectional engagers 240, 244 includes a plurality of spring fingers 250 defining a cavity 254 for receiving a pin 260 of the inner conductors 44, or the pin 264 from the unidirectional pin engager 244. It should be understood that in some embodiments, the bi-directional engager 240 may be integrated with the first adaptor portion 204a and the unidirectional engager 244 may be integrated with the second adaptor portion 204b.

As a safety precaution, the breakaway connector 200 may be configured such that the interface between the input and output adaptors 204a, 204b becomes, and remains, electrically engaged before and after engagement with the inner conductor 44. In the described embodiment, this may be achieved by causing the one or more of the pins 260, 264 to dislodge from the conductive spring fingers 250 and a respective cavity 254, before the outer conductor 50 disconnects from the conductive tubular posts 212 or the conductive outer body 236. Alternatively, a simple flex connector (not shown) may be employed to maintain grounding contact of the outer conductor 50. This electrical arrangement prevents hazards created by television or broadband services remaining functional (due to the continued connection of the inner conductor 44) even as the CATV system ground is disabled. This can mislead a subscriber or service technician to believe that the breakaway connector is fully functional even though electrical hazards may still be present.

The first and second connector portions 192, 196 are configured to fit firmly together ensuring high RF transparency and electrical continuity, but are configured to pull apart without damage once a threshold level of tension is achieved in the drop cables 116, 118. The tension threshold should be no more than the weakest of several other components, namely, the cable structure itself, a siding staple, or any other mount used to secure the drop cable 118 to a structure, such as a utility pole, a home/residence, or other building.

In the described embodiment, a forty pound (40 lb.) threshold may be an upper limit for a compliant cable. A lower threshold might be determined or driven by the amount of force the connector 200 (inserted midway around a short service loop of about two feet (2 ft.) in length and supported at each end) might experience if wind were to cause the span to sway—probably about ten pounds (10 lbs.) of force. It will be appreciated that the connector 200 must remain operable in the face of a reasonable magnitude of wind-induced sway/loads. Furthermore, it will be appreciated that the connector 200 should allow for some magnitude of torsional slippage without releasing, i.e., to prevent the connector 200 from releasing due to small repeated twisting of the coaxial cable.

While the described embodiment comprises resilient fingers 220 to couple the first and second adaptor portions 204a, 204b, the breakaway connector 200 may incorporate a cooperating bump and detent feature which remain interlocked at a low tensile value, but disengage at a higher tensile value. This arrangement may result in a release tension which is more narrowly contained around a desired nominal value while being less sensitive to temperature variations, or the presence of oils on cooperating surfaces. The cross-sectional shape of a cooperating bump and detent may include input and output ramps having shallow and steep angles. Such arrangements facilitate the reassembly of the breakaway connector inasmuch as the force required to couple the connector may be less than the force required to separate the connector.

The breakaway connector 200 includes an external seal 270 disposed over and between the first and second adaptor portions 204a, 204b when the connector 200 is secured. The breakaway connector 200 may include one or more internal seals (not shown) to prevent moisture entry when the connector 200 is separated or open to ambient weather conditions. Such internal seals may be employed in addition to at least the standard levels of moisture migration prevention when the connection is secured.

Referring to FIGS. 7-11, the coaxial cable 116, 118 extends along a cable axis or a longitudinal axis 42. In one embodiment, the cable 116, 118 includes: (a) an elongated center conductor or inner conductor 44; (b) an elongated insulator 46 coaxially surrounding the inner conductor 44; (c) an elongated, conductive foil layer 48 coaxially surrounding the insulator 46; (d) an elongated outer conductor 50 coaxially surrounding the foil layer 48; and (e) an elongated sheath, sleeve or jacket 52 coaxially surrounding the outer conductor 50.

The inner conductor 44 is operable to carry data signals to and from a data network (not shown). Depending upon the embodiment, the inner conductor 44 can be a strand, a solid wire or a hollow, tubular wire. The inner conductor 44 is, in one embodiment, constructed of a conductive material suitable for data transmission, such as a metal or alloy including copper, including, but not limited, to copper-clad aluminum ("CCA"), copper-clad steel ("CCS") or silver-coated copper-clad steel ("SCCCS").

The insulator 46, in one embodiment, is a dielectric having a tubular shape. In one embodiment, the insulator 46 is radially compressible along a radius or radial line 54, and the insulator 46 is axially flexible along the longitudinal axis 42. Depending upon the embodiment, the insulator 46 can be a suitable polymer, such as polyethylene ("PE") or a fluoropolymer, in solid or foam form.

Figure 7:
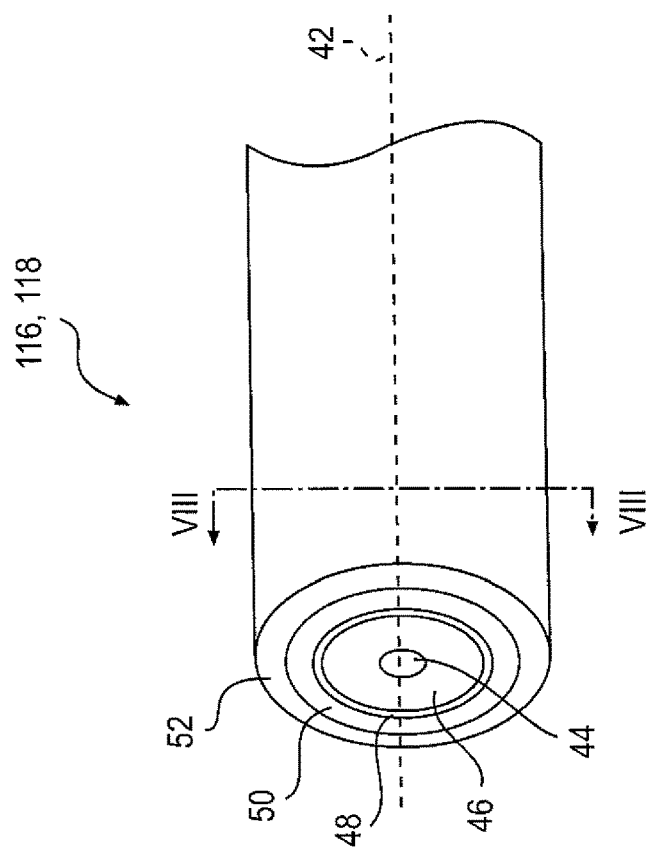
FIG. 7 is an isometric view of one embodiment of a coaxial cable which is configured to be operatively coupled to a data network.

In the embodiment illustrated in FIG. 7, the outer conductor 50 includes a conductive RF shield or electromagnetic radiation shield. In such embodiment, the outer conductor 50 includes a conductive screen, mesh or braid or otherwise has a perforated configuration defining a matrix, grid or array of openings. In one such embodiment, the braided outer conductor 50 has an aluminum material or a suitable combination of aluminum and polyester. Depending upon the embodiment, cable 116, 118 can include multiple, overlapping layers of braided outer conductors 50, such as a dual-shield configuration, tri-shield configuration or quad-shield configuration.

In one embodiment, as described below, the connector 2 electrically grounds the outer conductor 50 of the coaxial cable 116, 118. When the inner conductor 44 and external electronic devices generate magnetic fields, the grounded outer conductor 50 sends the excess charges to ground. In this way, the outer conductor 50 cancels all, substantially all or a suitable amount of the potentially interfering magnetic fields. Therefore, there is less, or an insignificant, disruption of the data signals running through inner conductor 44. Also, there is less, or an insignificant, disruption of the operation of external electronic devices near the cable 116, 118.

In one such embodiment, the cable 116, 118 has one or more electrical grounding paths. One grounding path extends from the outer conductor 50 to the cable connector's conductive post, and then from the connector's conductive post to an interface port (not shown). Depending upon the embodiment, an additional or alternative grounding path can extend from the outer conductor 50 to the cable connector's conductive body, then from the connector's conductive body to the connector's conductive nut or coupler, and then from the connector's conductive coupler to the interface port (not shown).

The conductive foil layer 48, in one embodiment, is an additional, tubular conductor which provides additional shielding of the magnetic fields. In one embodiment, the foil layer 48 includes a flexible foil tape or laminate adhered to the insulator 46, assuming the tubular shape of the insulator 46. The combination of the foil layer 48 and the outer conductor 50 can suitably block undesirable radiation or signal noise from leaving the cable 116, 118. Such combination can also suitably block undesirable radiation or signal noise from entering the cable 116, 118. This can result in an additional decrease in disruption of data communications through the cable 116, 118 as well as an additional decrease in interference with external devices, such as nearby cables and components of other operating electronic devices.

In one embodiment, the jacket 52 has a protective characteristic, guarding the cable's internal components from damage. The jacket 52 also has an electrical insulation characteristic. In one embodiment, the jacket 52 is compressible along the radial line 54 and is flexible along the longitudinal axis 42. The jacket 52 is constructed of a suitable, flexible material such as polyvinyl chloride (PVC) or rubber. In one embodiment, the jacket 52 has a lead-free formulation including black-colored PVC and a sunlight resistant additive or sunlight resistant chemical structure.

Figure 9:
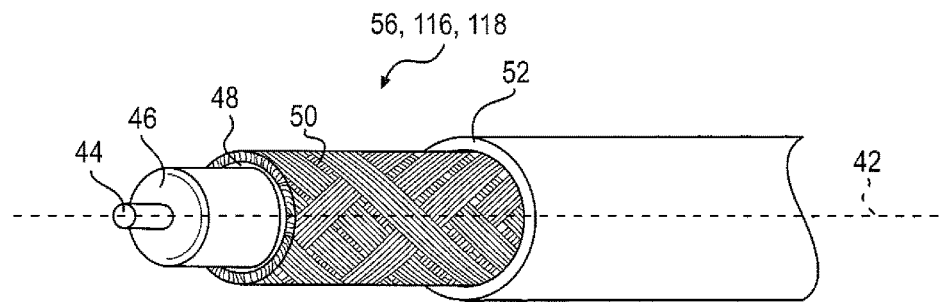
FIG. 9 is an isometric view of one embodiment of a coaxial cable which is configured to be operatively coupled to a data network, illustrating a three-stepped prepared end of the coaxial cable.
Figure 10:
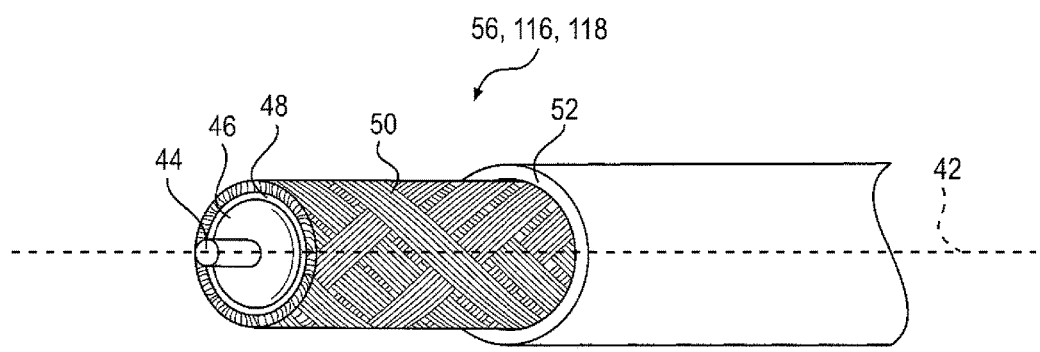
FIG. 10 is an isometric view of one embodiment of a coaxial cable which is configured to be operatively coupled to a data network, illustrating a two stepped prepared end of the coaxial cable.

Referring to FIGS. 9 and 10, in one embodiment an installer or preparer prepares a terminal end 56 of the cable 116, 118 so that it can be mechanically connected to a connector, for example, first or second connector portion 192, 196. To do so, the preparer removes or strips away differently sized portions of the jacket 52, outer conductor 50, foil 48 and insulator 46 so as to expose the side walls of the jacket 52, outer conductor 50, foil layer 48 and insulator 46 in a stepped or staggered fashion. In the example shown in FIG. 9, the prepared end 56 has a three step-shaped configuration. In the example shown in FIG. 10, the prepared end 58 has a two step-shaped configuration. The preparer can use cable preparation pliers or a cable stripping tool to remove such portions of the cable 116, 118. At this point, the cable 116, 118 is ready to be connected to the connector.

Depending upon the embodiment, the components of the cable 116, 118 can be constructed of various materials which have some degree of elasticity or flexibility. The elasticity enables the cable 116, 118 to flex or bend in accordance with broadband communications standards, installation methods or installation equipment. Also, the radial thicknesses of the cable 116, 118, the inner conductor 44, the insulator 46, the conductive foil layer 48, the outer conductor 50 and the jacket 52 can vary based upon parameters corresponding to broadband communication standards or installation equipment.

Figure 11:
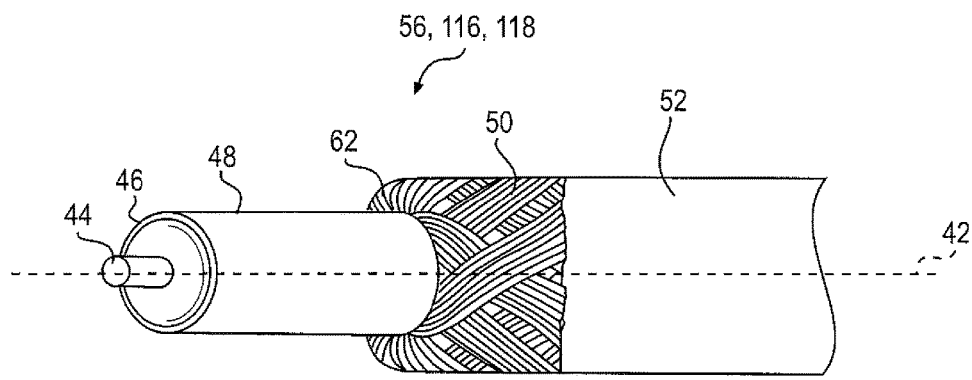
FIG. 11 is an isometric view of one embodiment of a coaxial cable which is configured to be operatively coupled to a data network, illustrating the folded-back, braided outer conductor of a prepared end of the coaxial cable.

In one embodiment illustrated in FIG. 11, the installer or preparer performs a folding process to prepare the cable 116, 118 for connection to connector, for example, first or second connector portion 192, 196. In the example illustrated, the preparer folds the braided outer conductor 50 backward onto the jacket 52. As a result, the folded section 60 is oriented inside out. The bend or fold 62 is adjacent to the foil layer 48 as shown. Certain embodiments of the connector include a tubular post. In such embodiments, this folding process can facilitate the insertion of such post in between the braided outer conductor 50 and the foil layer 48.

Depending upon the embodiment, the components of the cable 116, 118 can be constructed of various materials which have some degree of elasticity or flexibility. The elasticity enables the cable 116, 118 to flex or bend in accordance with broadband communications standards, installation methods or installation equipment. Also, the radial thicknesses of the cable 116, 118, the inner conductor 44, the insulator 46, the conductive foil layer 48, the outer conductor 50, and the jacket 52 can vary based upon parameters corresponding to broadband communication standards or installation equipment.

Additional embodiments include any one of the embodiments described above, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

What is claimed is:

1. A tensile-force buffering apparatus interposing a physical structure and a drop clamp having a messenger of an input drop cable secured thereto, the tensile-force buffering apparatus comprising:
    a housing defining an elongate inner cavity and a retainer; and
    a spring-strut assembly including
        a central shaft,
        a retention member at a first end of the central shaft, and
        a coil spring disposed about the central shaft,
    wherein the retention member is configured to be received and held by the housing, the retention member being configured to be released from the housing when a load or force exceeds a certain predetermined threshold level to prevent the load or force that exceeds such a predetermined threshold level from damaging either the housing or the retention member,
    wherein the spring-strut assembly is received in the inner cavity of the housing and the retention member is held by the retainer while a load compressing the coil spring is less than the predetermined threshold load, and
    wherein the retention member is released from the housing when the load compressing the coil spring reaches the predetermined threshold load, thereby effecting separation of the spring-strut assembly from the housing.

2. The tensile-force buffering apparatus of claim 1, further comprising:
    a first flange extending from the housing and being configured to engage a first connector portion of a breakaway connector; and
    a second flange extending from the spring-strut assembly and being configured to engage a second connector portion of a breakaway connector.

3. The tensile-force buffering apparatus of claim 2, wherein the separation of the spring-strut assembly from the housing causes the first flange and the second flange to move away from one another.

4. The tensile-force buffering apparatus of claim 3, further comprising the breakaway connector, the breakaway connector being configured to couple prepared ends of a pair of coaxial cables.

5. The tensile-force buffering apparatus of claim 4, wherein the breakaway connector includes:
    a first adaptor portion configured to be coupled to a prepared end of a first coaxial cable, the first adaptor portion including a first conductive outer body having a resilient coupling member; and
    a second adaptor portion configured to be coupled to a prepared end of a second coaxial cable, the second adaptor portion including a second conductive outer body having a second coupling member configured to be coupled with the resilient coupling member,
    wherein the breakaway connector is configured to maintain grounding and shielding conductivity of the pair of coaxial cables through the first conductive outer body and the second conductive outer body.

6. The tensile-force buffering apparatus of claim 5, wherein the movement of the first flange and the second flange away from one another causes the first adaptor portion and the second adaptor portion to decouple and cease grounding and shielding conductivity of the pair of coaxial cables.

7. A tensile-force buffering apparatus interposing a physical structure and a drop clamp having a messenger of an input drop cable secured thereto, the tensile-force buffering apparatus comprising:
    a housing;
    a spring-strut assembly including
        a central shaft,
        a retention member at a first end of the central shaft,
        a coil spring disposed about the central shaft, and
        a fastener configured to engage an end of the central shaft to transfer tensile loads from the central shaft into the coil spring and the retention member,
    wherein the retention member is configured to be received and held by the housing, the retention member being configured to be released from the housing when a load or force exceeds a certain predetermined threshold level to prevent the load or force that exceeds such a predetermined threshold level from damaging either the housing or the retention member.

8. The tensile-force buffering apparatus of claim 7, wherein the housing includes a first shell and a second shell cooperating to define an elongate inner cavity in the housing, each of the first shell and the second shell defining a retainer, and
    wherein the spring-strut assembly is received in the inner cavity of the housing and the retention member is held by the retainer while a load compressing the coil spring is less than a predetermined threshold load, and the retention member is released from the housing when the load compressing the coil spring reaches the predetermined threshold load, thereby effecting separation of the spring-strut assembly from the housing.

9. The tensile-force buffering apparatus of claim 8, further comprising a strap wrapped around the first shell and the second shell to hold the first shell and the second shell together.

10. The tensile-force buffering apparatus of claim 8, further comprising:
    a first flange extending from the housing and being configured to engage a first connector portion of a breakaway connector; and a second flange extending from the spring-strut assembly and being configured to engage a second connector portion of a breakaway connector.

11. The tensile-force buffering apparatus of claim 10, wherein the separation of the spring-strut assembly from the housing causes the first flange and the second flange to move away from one another.

12. The tensile-force buffering apparatus of claim 11, further comprising the breakaway connector, the breakaway connector being configured to couple prepared ends of a pair of coaxial cables.

13. The tensile-force buffering apparatus of claim 12, wherein the breakaway connector includes:
  a first adaptor portion configured to be coupled to a prepared end of a first coaxial cable, the first adaptor portion including a first conductive outer body having a resilient coupling member; and
  a second adaptor portion configured to be coupled to a prepared end of a second coaxial cable, the second adaptor portion including a second conductive outer body having a second coupling member configured to be coupled with the resilient coupling member,
  wherein the breakaway connector is configured to maintain grounding and shielding conductivity of the pair of coaxial cables through the first conductive outer body and the second conductive outer body.

14. The tensile-force buffering apparatus of claim 13, wherein the movement of the first flange and the second flange away from one another causes the first adaptor portion and the second adaptor portion to decouple and cease grounding and shielding conductivity of the pair of coaxial cables.

* * * * *